(12) United States Patent
Li

(10) Patent No.: US 11,353,168 B2
(45) Date of Patent: Jun. 7, 2022

(54) WAVELENGTH CONVERSION DEVICE

(71) Applicant: Delta Electronics, Inc., Taoyuan (TW)

(72) Inventor: Jih-Chi Li, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 306 days.

(21) Appl. No.: 16/717,782

(22) Filed: Dec. 17, 2019

(65) Prior Publication Data
US 2021/0108767 A1    Apr. 15, 2021

(30) Foreign Application Priority Data

Oct. 15, 2019 (CN) .......................... 201910976424.4

(51) Int. Cl.
*F21K 9/64* (2016.01)
*H04N 9/31* (2006.01)
*G02B 26/00* (2006.01)

(52) U.S. Cl.
CPC .............. *F21K 9/64* (2016.08); *G02B 26/008* (2013.01); *H04N 9/3111* (2013.01)

(58) Field of Classification Search
CPC .................................. G03B 21/16; F21K 9/64
See application file for complete search history.

(56) References Cited

U.S. PATENT DOCUMENTS

| 7,196,354 B1 | 3/2007 | Erchak et al. |
| 9,982,878 B2 | 5/2018 | Weber et al. |
| 2011/0001418 A1* | 1/2011 | Tsai .................... H05K 1/056 313/46 |
| 2012/0162612 A1* | 6/2012 | Huang ............... G02B 27/123 353/31 |
| 2016/0077415 A1* | 3/2016 | Motoya ............... G03B 21/204 353/84 |
| 2016/0123557 A1* | 5/2016 | Xu ......................... F21V 13/08 362/84 |

(Continued)

FOREIGN PATENT DOCUMENTS

| CN | 103885274 A | 6/2014 |
| CN | 105974719 A | 9/2016 |

(Continued)

*Primary Examiner* — Andrew J Coughlin
(74) *Attorney, Agent, or Firm* — Kirton McConkie; Evan R. Witt

(57) ABSTRACT

The present disclosure provides a wavelength conversion device including a first thermal conductive plate, a wavelength conversion layer and a second thermal conductive plate. The wavelength conversion layer is disposed on the first side of the first thermal conductive plate and configured to perform a wavelength conversion. The second thermal conductive plate is disposed on the second side of the first thermal conductive plate. The first thermal conductive plate and the second thermal conductive plate are combined to conduct the heat generated by the wavelength conversion layer during the wavelength conversion. Since the thermal conductivity coefficients of the at least two thermal conductive plates are increased along the heat transferring path, it is advantageous to minimize the thermal resistance of the heat transferring path. Thus, the heat generated by the wavelength conversion layer during the wavelength conversion is dissipated along the heat transferring path to enhance the heat dissipation efficiency.

21 Claims, 12 Drawing Sheets

(56) References Cited

U.S. PATENT DOCUMENTS

| | | | |
|---|---|---|---|
| 2016/0238922 A1* | 8/2016 | Furuyama | G03B 21/204 |
| 2017/0180686 A1 | 6/2017 | Chen | |
| 2017/0293211 A1* | 10/2017 | Kobayashi | G02B 26/008 |
| 2018/0294390 A1 | 10/2018 | Yamana et al. | |
| 2019/0093871 A1 | 3/2019 | Sato et al. | |

FOREIGN PATENT DOCUMENTS

| | | |
|---|---|---|
| CN | 207396957 U | 5/2018 |
| CN | 208937894 U | 6/2019 |
| TW | M531657 U | 11/2016 |
| TW | 201723630 A | 7/2017 |
| TW | M549365 U | 9/2017 |
| TW | 201804171 A | 2/2018 |
| TW | I632323 B | 8/2018 |
| TW | 201906195 A | 2/2019 |
| TW | 201917483 A | 5/2019 |

* cited by examiner

WAVELENGTH CONVERSION DEVICE

FIELD OF THE DISCLOSURE

The present disclosure relates to a wavelength conversion device, and more particularly to a wavelength conversion device having a heterogeneous composite board.

BACKGROUND OF THE DISCLOSURE

The wavelength conversion device utilizes, for example, a laser light source to excite a phosphor to obtain a predetermined monochromatic or polychromatic light, and has been widely applied in the fields of illumination sources, projection displays, and so on. Taking the projection display as an example, a laser light source is utilized to irradiate the phosphor wheel to produce the desired display color.

In the projection display application, the wavelength conversion device can be distinguished as a reflective type and a transmissive type. Taking the reflective wavelength conversion device as an example, the conventional reflective wavelength conversion device mainly includes a substrate, a reflective layer and a phosphor layer. The reflective layer is disposed between the substrate and the phosphor layer, and the phosphor layer is excited by the light source to generate predetermined monochromatic or polychromatic light. The generated monochromatic or polychromatic light is reflected by the reflective layer at the same time. When the phosphor layer is excited by the light source, it is accompanied with heat generation. Furthermore, as the power of the light source for excitation is gradually increased, the amount of heat generated by the phosphor layer is also increased. However, the conventional reflective wavelength conversion device includes a single substrate directly connected to a heat dissipation device merely. The high thermal resistance is formed between the single substrate and the heat dissipation device so that the heat dissipation efficiency is reduced. Under the condition of high power light source for excitation, the heat generated by the phosphor layer being excited by the excitation light source cannot be dissipated in time. Consequently, the phosphor layer is kept at a high temperature to perform the wavelength conversion and tends to deteriorate, thereby causing the light-emitting rate of the reflective wavelength conversion device to be sharply reduced. On the other hand, the transmissive wavelength conversion device includes a transparent substrate and a phosphor layer. Similarly, the high thermal resistance is formed between the transparent substrate and the heat dissipation device so that the heat dissipation efficiency is reduced. Under the condition of high power light source for excitation, it is also unable to dissipate the heat generated by the phosphor layer excited by the excitation light source in time. The phosphor layer is kept at a high temperature to perform the wavelength conversion and tends to deteriorate.

Therefore, there is a need of providing a wavelength conversion device having a heterogeneous composite board to address the above issues encountered by the prior arts.

SUMMARY OF THE DISCLOSURE

An object of the present disclosure is to provide a wavelength conversion device. The wavelength conversion device includes a first thermal conductive plate having a lower thermal conductivity coefficient and a second thermal conductive plate having a higher thermal conductivity coefficient, so as to form a heterogeneous composite board. A wavelength conversion layer is disposed on a first side of the first thermal conductive plate having the lower thermal conductivity coefficient, and the second thermal conductive plate having the higher thermal conductivity coefficient is connected to a second side of the first thermal conductive plate. Since the thermal conductivity coefficients of the at least two thermal conductive plates are increased along the heat transferring path, it is beneficial to minimize the thermal resistance of the heat transferring path. Thus, the heat generated by the wavelength conversion layer during the wavelength conversion is dissipated along the heat transferring path to enhance the heat dissipation efficiency.

Another object of the present disclosure is to provide a wavelength conversion device. The wavelength conversion device is applicable to for example a reflective wavelength conversion device or a transmissive wavelength conversion device. In the reflective wavelength conversion device, a wavelength conversion layer is disposed on a reflective surface of a first thermal conductive plate, and a second thermal conductive plate and a third thermal conductive are sequentially disposed on a second side, which is opposite to the reflective surface of the first thermal conductive plate. Since the thermal conductivity coefficients of the at least three thermal conductive plates are increased from the reflective surface along the heat transferring path, it is beneficial to minimize the thermal resistance of the heat transferring path. Thus, the heat generated by the wavelength conversion layer during the wavelength conversion is dissipated along the heat transferring path to enhance the heat dissipation efficiency.

A further object of the present disclosure is to provide a wavelength conversion device. The wavelength conversion device is applied to for example a phosphor wheel of a projector. The wavelength conversion layer includes at least one conversion region arranged for example in a ring shape. In the reflective wavelength conversion application, the wavelength conversion layer is disposed on the reflective surface of the plurality of thermal conductive plates, and the thermal conductivity coefficients of the plurality of thermal conductive plates are increased from the reflective surface along the heat transferring path. Thus, it is beneficial to minimize the thermal resistance of the heat transferring path. In addition, the plurality of thermal conductive plates are connected through at least one adhesive layer. The adhesive layer includes at least two bonding regions. One bonding region spatially corresponding to the conversion region has a thermal conductivity coefficient, not less than that of another bonding region. Thus, it ensures that the heat transferring path is optimized. The heat generated by the conversion region of the wavelength conversion layer during the wavelength conversion is efficiently dissipated along the heat transferring path, thereby enhancing the heat dissipation efficiency and avoiding the degradation of conversion performance.

In accordance with an aspect of the present disclosure, a wavelength conversion device is provided. The wavelength conversion device includes a first thermal conductive plate, a wavelength conversion layer and a second thermal conductive plate. The first thermal conductive plate includes a first side and a second side. The first side and the second side are opposite to each other. The wavelength conversion layer is disposed on the first side of the first thermal conductive plate and configured to perform a wavelength conversion. The second thermal conductive plate is disposed on the second side of the first thermal conductive plate. The thermal conductivity coefficient of the second thermal conductive plate is greater than the thermal conductivity coefficient of the first thermal conductive plate, and the first thermal conductive plate and the second thermal conductive plate are configured to conduct heat generated by the wavelength conversion layer during the wavelength conversion.

In an embodiment, the wavelength conversion device further includes a third thermal conductive plate connected to the second thermal conductive plate. The thermal conductivity coefficient of the third thermal conductive plate is greater than the thermal conductivity coefficient of the second thermal conductive plate. The first side of the first thermal conductive plate includes a reflective surface, and the wavelength conversion layer includes at least one conversion region spatially corresponding to the reflective surface.

In an embodiment, the wavelength conversion device further includes a first adhesive layer disposed between the first thermal conductive plate and the second thermal conductive plate and including at least one first bonding region and at least one second bonding region. The at least one first bonding region spatially corresponds to the at least one conversion region, and the thermal conductivity coefficient of the first bonding region is not less than the thermal conductivity coefficient of the second bonding region.

In an embodiment, a vertical projection of the wavelength conversion layer on the first thermal conductive plate and a vertical projection of the first bonding region on the first thermal conductive plate are at least partially overlapped.

In an embodiment, the wavelength conversion device further includes a second adhesive layer disposed between the second thermal conductive plate and the third thermal conductive plate and including at least one third bonding region and at least one fourth bonding region. The at least one third bonding region spatially corresponds to the first bonding region, and the thermal conductivity coefficient of the third bonding region is not less than the thermal conductivity coefficient of the fourth bonding region.

In an embodiment, a vertical projection of the first bonding region on the second thermal conductive plate and a vertical projection of the third bonding region on the second thermal conductive plate are at least partially overlapped.

In an embodiment, the first bonding region and the third bonding region are made of a thermal conductive material, respectively, and the thermal conductive material includes at least one selected from the group consisting of silver, copper, diamond powder and graphene, and is further mixed with an adhesive.

In an embodiment, the second bonding region and the fourth bonding region are made of an adhesive, respectively.

In an embodiment, the wavelength conversion device is a phosphor wheel, and the wavelength conversion layer is arranged in a ring shape.

In accordance with another aspect of the present disclosure, a wavelength conversion device is provided. The wavelength conversion device includes a first thermal conductive plate, a wavelength conversion layer, at least one second thermal conductive plate and at least one first adhesive layer. The first thermal conductive plate includes a first side and a second side. The first side and the second side are opposite to each other. The wavelength conversion layer is disposed on the first side of the first thermal conductive plate, includes at least one conversion region and is configured to perform a wavelength conversion. The at least one second thermal conductive plate is disposed on the second side of the first thermal conductive plate. The thermal conductivity coefficient of the second thermal conductive plate is greater than the thermal conductivity coefficient of the first thermal conductive plate, and the first thermal conductive plate and the second thermal conductive plate are configured to conduct heat generated by the wavelength conversion layer during the wavelength conversion. The at least one first adhesive layer is disposed between the first thermal conductive plate and the second thermal conductive plate and includes at least one first bonding region and at least one second bonding region. The at least one first bonding region spatially corresponds to the at least one conversion region, and the thermal conductivity coefficient of the first bonding region is not less than the thermal conductivity coefficient of the second bonding region.

In an embodiment, the wavelength conversion device further includes a third thermal conductive plate connected to the second thermal conductive plate. The thermal conductivity coefficient of the third thermal conductive plate is greater than the thermal conductivity coefficient of the second thermal conductive plate. The first side of the first thermal conductive plate includes a reflective surface, and the at least one conversion region of the wavelength conversion layer spatially corresponds to the reflective surface.

In an embodiment, the wavelength conversion device further includes a second adhesive layer disposed between the second thermal conductive plate and the third thermal conductive plate and including at least one third bonding region and at least one fourth bonding region. The at least one third bonding region spatially corresponds to the first bonding region, and the thermal conductivity coefficient of the third bonding region is not less than the thermal conductivity coefficient of the fourth bonding region.

In an embodiment, a vertical projection of the wavelength conversion layer on the first thermal conductive plate and a vertical projection of the first bonding region on the first thermal conductive plate are at least partially overlapped. A vertical projection of the first bonding region on the second thermal conductive plate and a vertical projection of the third bonding region on the second thermal conductive plate are at least partially overlapped.

In an embodiment, the first bonding region and the third bonding region are made of a thermal conductive material, respectively, and the thermal conductive material includes at least one selected from the group consisting of silver, copper, diamond powder and graphene, and is further mixed with an adhesive.

In an embodiment, the second bonding region and the fourth bonding region are made of an adhesive, respectively.

In an embodiment, the first bonding region and the second bonding region form an outer ring and an inner ring, respectively.

In accordance with a further aspect of the present disclosure, a wavelength conversion device is provided. The wavelength conversion device includes a first thermal conductive plate, a wavelength conversion layer, a second thermal conductive plate and a third thermal conductive plate. The first thermal conductive plate includes a first side and a second side. The first side and the second side are opposite to each other. The first side includes a reflective surface. The wavelength conversion layer is disposed on the first side of the first thermal conductive plate and configured to perform a wavelength conversion. The second thermal conductive plate is disposed on the second side of the first thermal conductive plate. The thermal conductivity coefficient of the second thermal conductive plate is greater than the thermal conductivity coefficient of the first thermal conductive plate. The third thermal conductive plate is connected to the second thermal conductive plate. The thermal conductivity coefficient of the third thermal conductive plate is greater than the thermal conductivity coefficient of the second thermal conductive plate. The first thermal conductive plate, the second thermal conductive plate and the third thermal conductive plate are configured to conduct heat generated by the wavelength conversion layer during the wavelength conversion.

In an embodiment, the wavelength conversion device further includes a driving component connected to one of the first thermal conductive plate, the second thermal conductive plate and the third thermal conductive plate, and configured to drive the wavelength conversion device to rotate around a central rotating shaft of the wavelength conversion device.

In an embodiment, the wavelength conversion layer is arranged in a ring shape, and the central rotating shaft passes through a center of the ring shape.

In an embodiment, the wavelength conversion device further includes a first adhesive layer and a second adhesive layer. The first adhesive layer is disposed between the first thermal conductive plate and the second thermal conductive plate and includes at least one first bonding region and at least one second bonding region. The at least one first bonding region spatially corresponds to the at least one conversion region, and the thermal conductivity coefficient of the first bonding region is not less than the thermal conductivity coefficient of the second bonding region. The second adhesive layer is disposed between the second thermal conductive plate and the third thermal conductive plate and includes at least one third bonding region and at least one fourth bonding region. The at least one third bonding region spatially corresponds to the first bonding region, and the thermal conductivity coefficient of the third bonding region is not less than the thermal conductivity coefficient of the fourth bonding region.

In an embodiment, a vertical projection of the wavelength conversion layer on the first thermal conductive plate and a vertical projection of the first bonding region on the first thermal conductive plate are at least partially overlapped. A vertical projection of the first bonding region on the second thermal conductive plate and a vertical projection of the third bonding region on the second thermal conductive plate are at least partially overlapped.

In an embodiment, the first bonding region and the third bonding region are made of a thermal conductive material, respectively, and the thermal conductive material includes at least one selected from the group consisting of silver, copper, diamond powder and graphene, and is further mixed with an adhesive. The second bonding region and the fourth bonding region are made of an adhesive, respectively.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
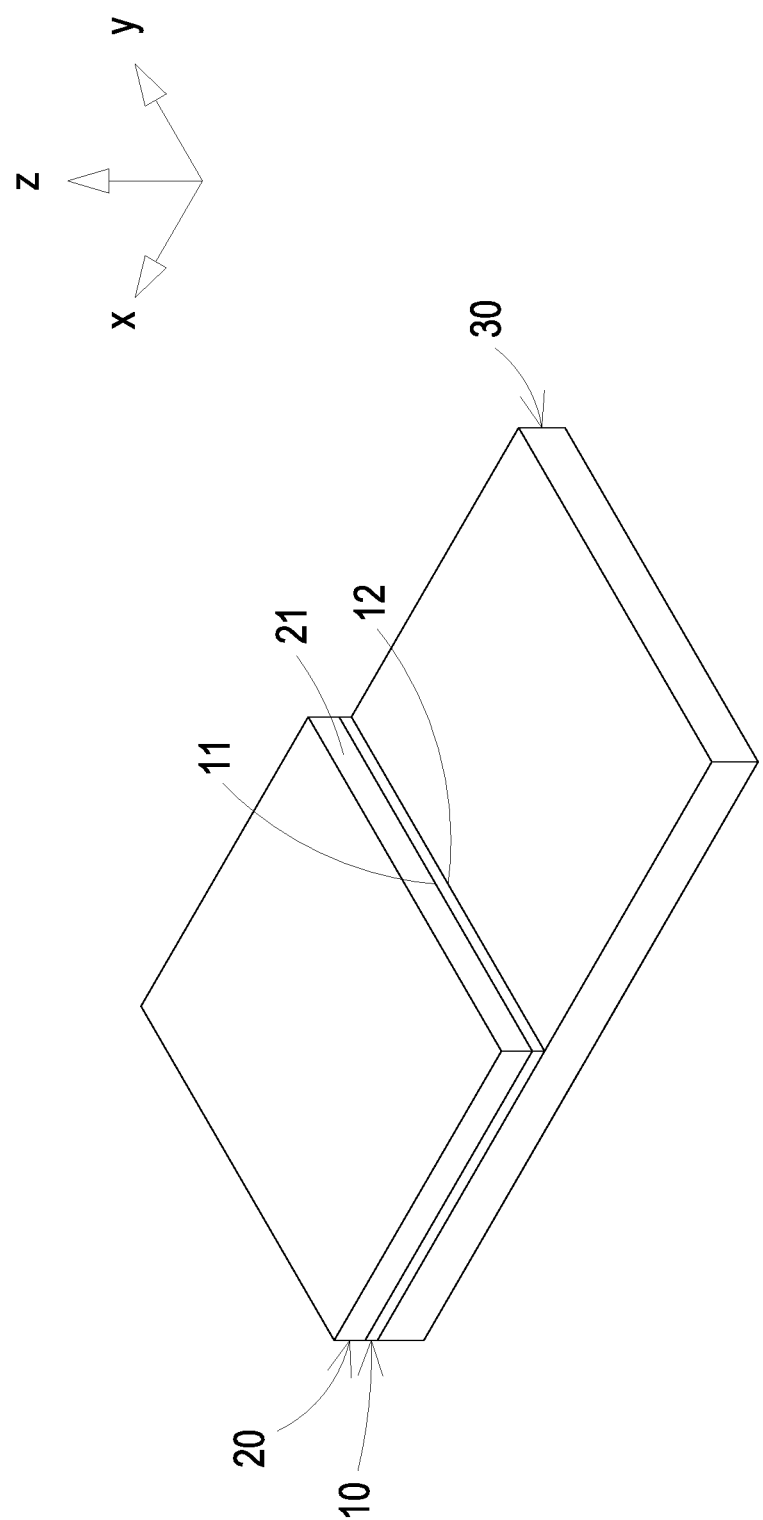
FIG. 1 is a perspective structural view illustrating a wavelength conversion device according to a first embodiment of the present disclosure.
Figure 2:
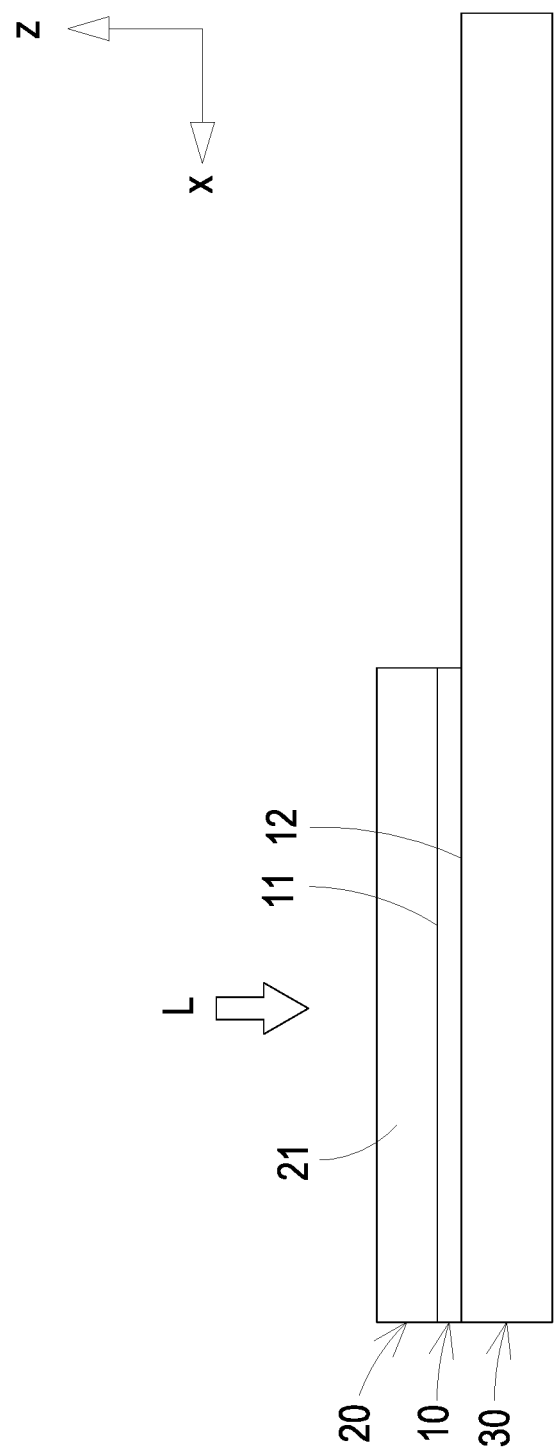
FIG. 2 is a lateral view illustrating the wavelength conversion device of FIG. 1.

FIG. 1 is a perspective structural view illustrating a wavelength conversion device according to a first embodiment of the present disclosure. FIG. 2 is a lateral view illustrating the wavelength conversion device of FIG. 1. The wavelength conversion device 1 includes a first thermal conductive plate 10, a wavelength conversion layer 20 and a second thermal conductive plate 30. The first thermal conductive plate 10 includes a first side 11 and a second side 12. The first side 11 is opposite to the second side 12. The interval distance between the first side 11 and the second side 12 is the thickness of the first thermal conductive plate 10. The wavelength conversion layer 20 is disposed on the first side 11 of the first thermal conductive plate 10, and includes at least one conversion region 21, which is configured to perform a wavelength conversion when the conversion region 21 is irradiated by an excitation light, such as a laser light L. The second thermal conductive plate 30 is disposed on the second side 12 of the first thermal conductive plate 10. In the embodiment, the thermal conductivity coefficient of the second thermal conductive plate 30 is greater than the thermal conductivity coefficient of the first thermal conductive plate 10. Preferably but not exclusively, the thermal conductivity coefficient of the wavelength conversion layer 20 is ranged from 0.3 W/mK to 30 W/mK. Preferably but not exclusively, the thermal conductivity coefficient of the first thermal conductive plate 10 is ranged from 30 W/mK to 240 W/mK. Preferably but not exclusively, the thermal conductivity coefficient of the second thermal conductive plate 30 is ranged from 170 W/mK to 5300 W/mK. The vertical projections of the wavelength conversion layer 20, the first thermal conductive plate 10 and the second thermal conductive plate 30 on the xy plane are at least partially overlapped. When the at least one conversion region 21 is irradiated by the laser light L, the heat generated by the wavelength conversion layer 20 during the wavelength conversion is conducted, for example in the vertical direction (z axis), from the first side 11 through a heat transferring path of the first thermal conductive plate 10 and the second thermal conductive plate 30 to be dissipated. Since the thermal conductivity coefficient of the second thermal conductive plate 30 is greater than the thermal conductivity coefficient of the first thermal conductive plate 10, it is beneficial to minimize the heat resistance of the heat transferring path. Thus, the heat generated by the at least one conversion region 21 of the wavelength conversion layer 20 during the wavelength conversion is dissipated along the heat transferring path to enhance heat dissipation efficiency. Preferably but not exclusively, in the embodiment, the first thermal conductive plate 10 and the second thermal conductive plat 30 are made of an alumina material and an aluminum nitride material, respectively. The wavelength conversion layer 20 is made of an yttrium aluminum garnet (YAG) material. The present disclosure is not limit thereto.

Figure 3:
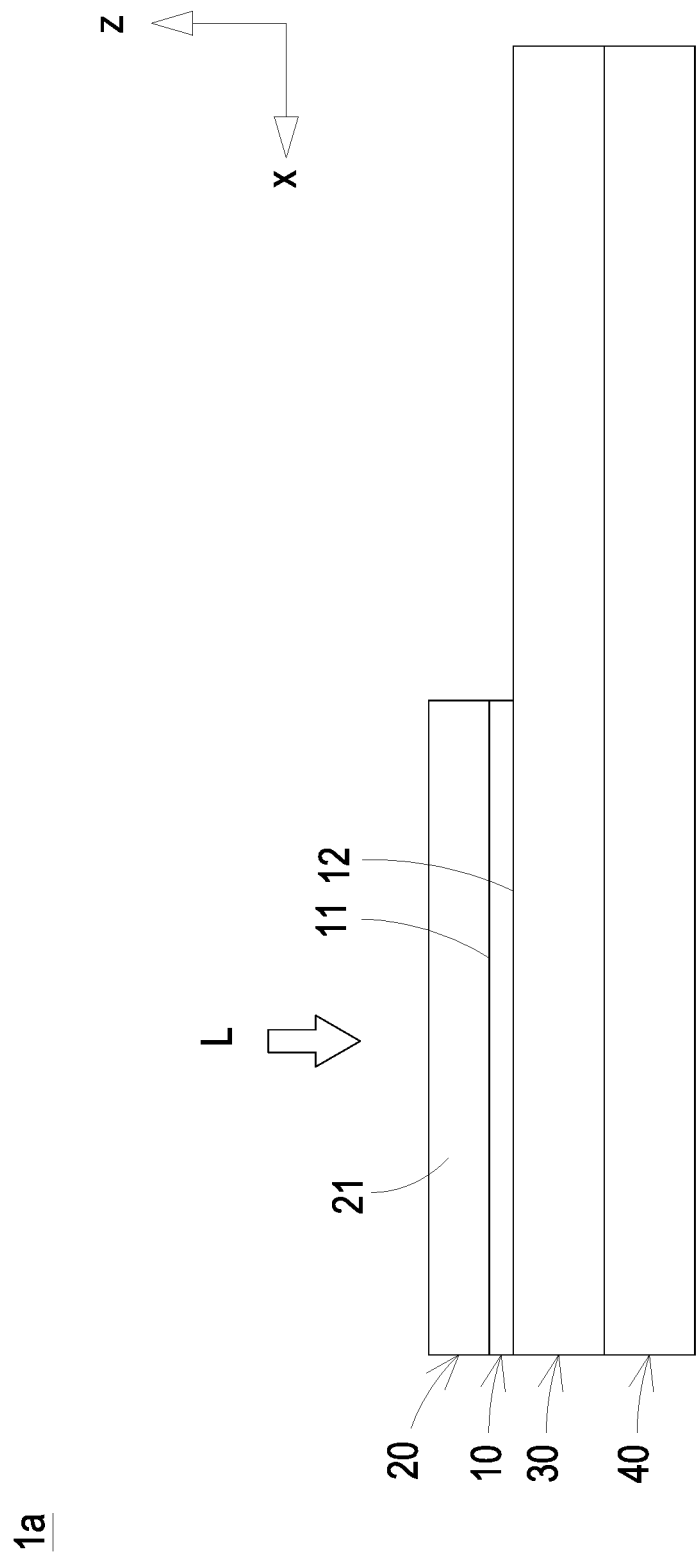
FIG. 3 is a lateral view illustrating a wavelength conversion device according to a second embodiment of the present disclosure.

FIG. 3 is a lateral view illustrating a wavelength conversion device according to a second embodiment of the present disclosure. In the embodiment, the structures, elements and functions of the wavelength conversion device 1a are similar to those of the wavelength conversion device 1 in FIGS. 1 and 2. The elements and features indicated by the numerals similar to those of the first embodiment mean similar elements and features, and are not redundantly described herein. In the embodiment, the wavelength conversion device 1a includes a first thermal conductive plate 10, a wavelength conversion layer 20, a second thermal conductive plate 30 and a third thermal conductive plate 40. The first thermal conductive plate 10 includes a first side 11 and a second side 12. The first side 11 is opposite to the second side 12. The interval distance between the first side 11 and the second side 12 is the thickness of the first thermal conductive plate 10. The wavelength conversion layer 20 is disposed on the first side 11 of the first thermal conductive plate 10, and includes at least one conversion region 21, which is configured to perform a wavelength conversion when the conversion region 21 is irradiated by an excitation light, such as a laser light L. The second thermal conductive plate 30 is disposed on the second side 12 of the first thermal conductive plate 10. In the embodiment, the thermal conductivity coefficient of the second thermal conductive plate 30 is greater than the thermal conductivity coefficient of the first thermal conductive plate 10. The third thermal conductive plate 40 is connected to the second thermal conductive plate 30. Namely, the first thermal conductive plate 10 and the third thermal conductive plate 40 are disposed on opposite sides of the second thermal conductive plate 30. In the embodiment, the thermal conductivity coefficient of the third thermal conductive plate 40 is greater than the thermal conductivity coefficient of the second thermal conductive plate 30. The first thermal conductive plate 10, the second thermal conductive plate 30 and the third thermal conductive plate 40 are configured to conduct heat generated by the wavelength conversion layer 20 during the wavelength conversion.

In the embodiment, the wavelength conversion device 1a is applicable to for example a reflective wavelength conversion device or a transmissive wavelength conversion device. Taking the wavelength conversion device 1a as an example of a reflective wavelength conversion device, the first side 11 of the first thermal conductive plate 10 includes a reflective surface. The wavelength conversion layer 20 is disposed on the first side 11 of the first thermal conductive plate 10 and the light is reflected by the first side 11. The second thermal conductive plate 30 and the third thermal conductive plate 40 are sequentially disposed on the second side 12 of the first thermal conductive plate 10. The vertical projections of the conversion region 21 of the wavelength conversion layer 20, the first thermal conductive plate 10, the second thermal conductive plate 30 and the third thermal conductive plate 40 on the xy plane are at least partially overlapped. The thermal conductivity coefficients of the first thermal conductive plate 10, the second thermal conductive plate 30 and the third thermal conductive plate 40 are increased from the first side 11 along the heat transferring path for example in the vertical direction (i.e. z axis). It is beneficial to minimize the heat resistance of the heat transferring path. Thus, the heat generated by the at least one conversion region 21 of the wavelength conversion layer 20 during the wavelength conversion is dissipated along the heat transferring path to enhance heat dissipation efficiency. On the other hand, taking the wavelength conversion device 1a as an example of a transmissive wavelength conversion device, the first thermal conductive plate 10, the second thermal conductive plate 30 and the third thermal conductive plate 40 are transparent. The first thermal conductive plate 10, the second thermal conductive plate 30 and the third thermal conductive plate 40 have the thermal conductivity coefficients increased along the heat transferring path from the first side 11 for example in the vertical direction (z axis). It is beneficial to minimize the heat resistance of the heat transferring path. Thus, the heat generated by the at least one conversion region 21 of the wavelength conversion layer 20 during the wavelength conversion is dissipated along the heat transferring path to enhance heat dissipation efficiency. In other embodiments, one of the first thermal conductive plate 10, the second thermal conductive plate 30 and the third thermal conductive plate 40 is omitted. The present disclosure is not limited thereto.

Figure 4:
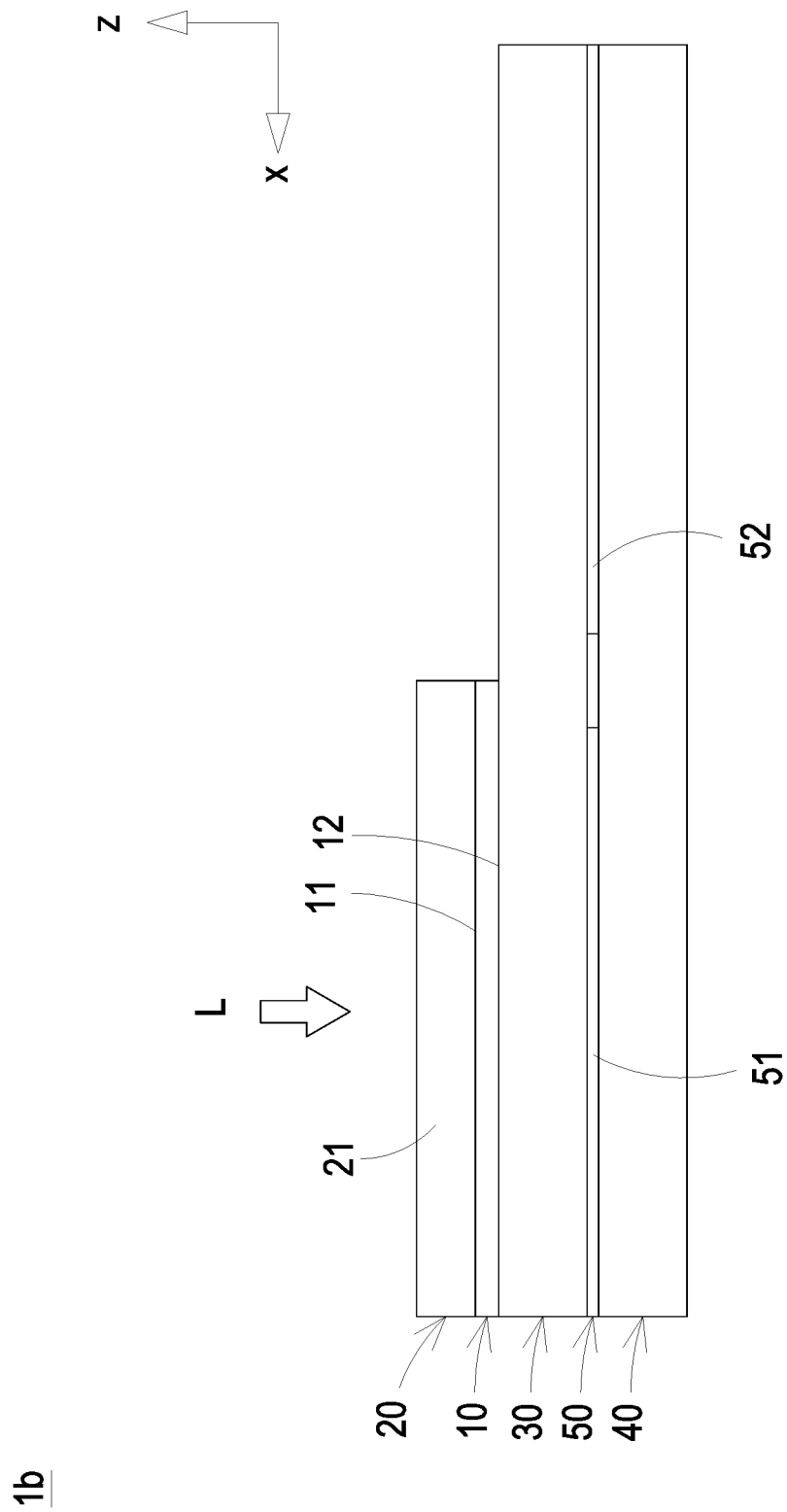
FIG. 4 is a lateral view illustrating a wavelength conversion device according to a third embodiment of the present disclosure.

FIG. 4 is a lateral view illustrating a wavelength conversion device according to a third embodiment of the present disclosure. In the embodiment, the structures, elements and functions of the wavelength conversion device 1b are similar to those of the wavelength conversion device 1a in FIG. 3. The elements and features indicated by the numerals similar to those of the second embodiment mean similar elements and features, and are not redundantly described herein. In the embodiment, the wavelength conversion device 1b is applicable to for example a reflective wavelength conversion device. Preferably but not exclusively, the first thermal conductive plate 10 is made of titanium dioxide and silicone and disposed on the second thermal conductive plate 30, so that a reflective surface is formed on the first side 11 of the first thermal conductive plate 10. In an embodiment, preferably but not exclusively, the first thermal conductive plate 10 is formed by sintering of titanium dioxide mixed with glass powder or titanium dioxide mixed with alumina powder at a high temperature. Preferably but not exclusively, the second thermal conductive plate 30 is a ceramic substrate, such as an aluminum nitride ceramic substrate. The present disclosure is not limited thereto. In the embodiment, the wavelength conversion device 1b further includes a first adhesive layer 50 disposed between the second thermal conductive plate 30 and the third thermal conductive plate 40. The first adhesive layer 50 includes at least one first bonding region 51 and at least one second bonding region 52. In the embodiment, the at least one first bonding region 51 spatially corresponds to the at least one conversion region 21 of the wavelength conversion layer 20. The thermal conductivity coefficient of the first bonding region 51 is not less than the thermal conductivity coefficient of the second bonding region 52. In the embodiment, a vertical projection of the conversion region 21 of the wavelength conversion layer 20 on the first thermal conductive plate 10 and a vertical projection of the first bonding region 51 on the first thermal conductive plate 10 or the second thermal conductive plate 30 are at least partially overlapped. In the embodiment, the first bonding region 51 is made of a thermal conductive material, and the thermal conductive material includes at least one selected from the group consisting of silver, copper, diamond powders and graphene, and is further mixed with an adhesive. Preferably but not exclusively, the second bonding region 52 is made of an adhesive, such as silicone, epoxy or other adhesive. Alternatively, the second bonding region 52 is made of the thermal conductive material similar to that of the first bonding region 51. The present disclosure is not limited thereto.

In the embodiment, the second thermal conductive plate 30 and the third thermal conductive plate 40 are connected through the first adhesive layer 50, so as to form a heterogeneous composite board with good adhesion and good heat dissipation. The first bonding region 51 of the first adhesive layer 50 has a high thermal conductivity coefficient and spatially corresponds to the at least one conversion region 21. Since the vertical projections of the at least one conversion region 21 of the wavelength conversion layer 20, the first thermal conductive plate 10, the second thermal conductive plate 30, the first bonding region 51 and the third thermal conductive plate 40 on the xy plane are at least partially overlapped, it ensures that the heat transferring path for example along the z axis is optimized. Thus, the heat generated by the conversion region 21 during the wavelength conversion is efficiently dissipated along the heat transferring path, to enhance the heat dissipation efficiency and avoid degradation of conversion performance. On the other hand, since the second bonding region 52 of the first adhesive layer 50 is provided with good adhesion, it ensures that the second thermal conductive plate 30 and the third thermal conductive plate 40 are connected firmly and further prevents from forming the thermal resistance on the heat transferring path at the same time. Thus, the heat generated by the at least one conversion region 21 of the wavelength conversion layer 20 during the wavelength conversion is conducted from the first side 11 along the heat transferring path, for example in the vertical direction (i.e. z axis), and is dissipated through the first thermal conductive plate 10, the second thermal conductive plate 30 and the third thermal conductive plate 40, to enhance heat dissipation efficiency.

Figure 5:
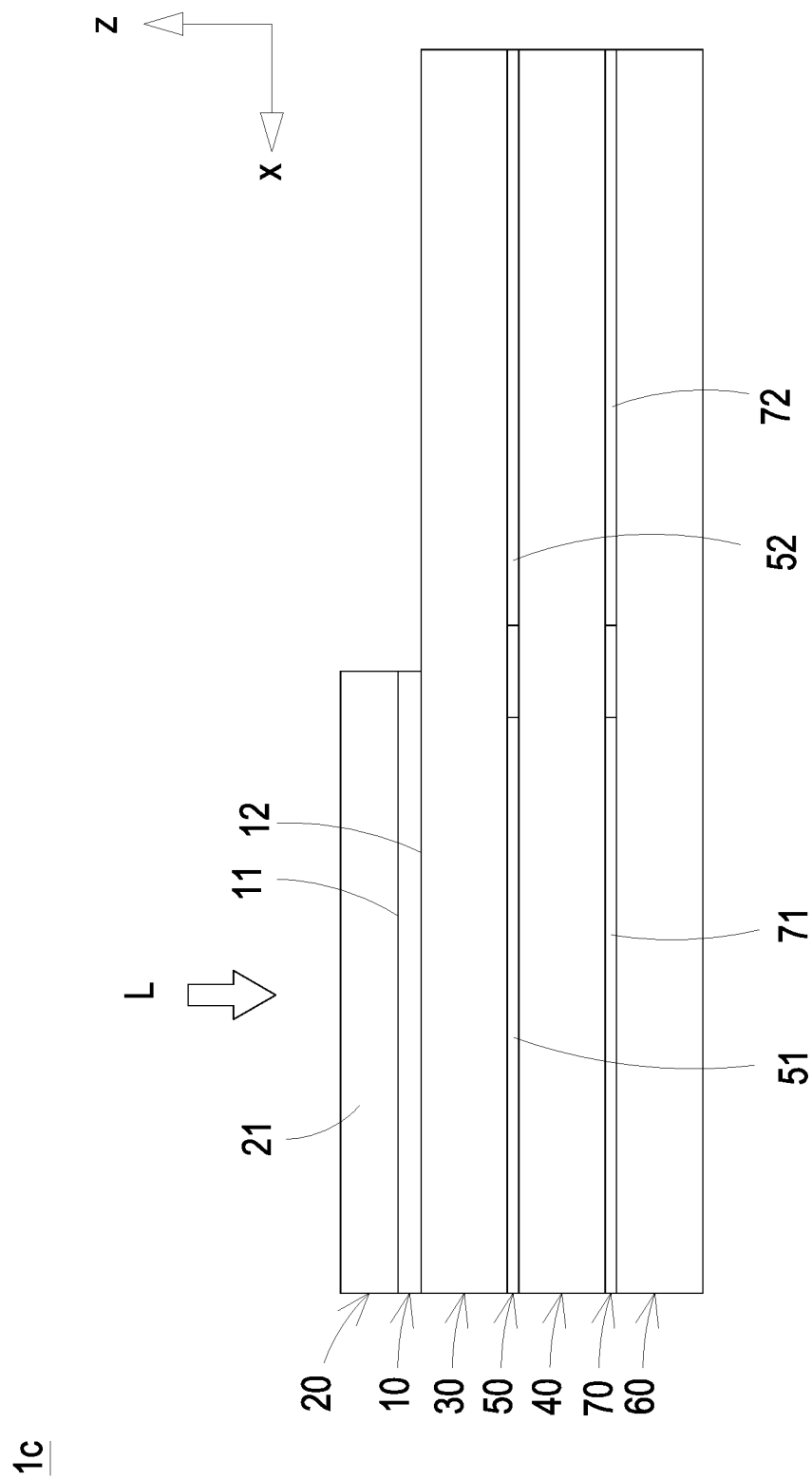
FIG. 5 is a lateral view illustrating a wavelength conversion device according to a fourth embodiment of the present disclosure.

FIG. 5 is a lateral view illustrating a wavelength conversion device according to a fourth embodiment of the present disclosure. In the embodiment, the structures, elements and functions of the wavelength conversion device 1c are similar to those of the wavelength conversion device 1b in FIG. 4. The elements and features indicated by the numerals similar to those of the second embodiment mean similar elements and features, and are not redundantly described herein. In the embodiment, the wavelength conversion device 1c further includes a fourth thermal conductive plate 60 and a second adhesive layer 70. The second adhesive layer 70 is disposed between the third thermal conductive plate 40 and the fourth thermal conductive plate 60, and includes at least one third bonding region 71 and at least one fourth bonding region 72. In the embodiment, the at least one third bonding region 71 spatially corresponds to the first bonding region 51, and the thermal conductivity coefficient of the third bonding region 71 is not less than the thermal conductivity coefficient of the fourth bonding region 72. In the embodiment, a vertical projection of the at least one conversion region 21 of the wavelength conversion layer 20 on the second thermal conductive plate 30 and a vertical projection of the first bonding region 51 on the second thermal conductive plate 30 are at least partially overlapped. A vertical projection of the first bonding region 51 on the third thermal conductive plate 40 and a vertical projection of the third bonding region 71 on the third thermal conductive plate 40 are at least partially overlapped. Preferably but not exclusively, the first bonding region 51 and the third bonding region 71 are made of a thermal conductive material, respectively, and the thermal conductive material includes at least one selected from the group consisting of silver, copper, diamond powder and graphene, and is further mixed with an adhesive. Preferably but not exclusively, the second bonding region 52 and the fourth bonding region 72 are made of silicone, epoxy or other adhesive. The present disclosure is not limited thereto.

In the embodiment, the second thermal conductive plate 30, the third thermal conductive plate 40 and the fourth thermal conductive plate 60 are connected by the first adhesive layer 50 and the second adhesive layer 70, respectively. The first bonding region 51 of the first adhesive layer 50 and the third bonding region 71 of the second adhesive layer 70 have high thermal conductivity coefficients and spatially correspond to the at least one conversion region 21. It ensures that the heat transferring path is optimized. Thus, the heat generated by the conversion region 21 during the wavelength conversion is efficiently dissipated along the heat transferring path, to enhance the heat dissipation efficiency. On the other hand, since the second bonding region 52 of the first adhesive layer 50 and the fourth bonding region 72 of the second adhesive layer 70 are provided with good adhesion, it ensures the connection of the second thermal conductive plate 30 and the third thermal conductive plate 40 and the connection of the third thermal conductive plate 40 and the fourth thermal conductive plate 60, and further prevents from forming the thermal resistance on the heat transferring path at the same time. Thus, the heat generated by the at least one conversion region 21 of the wavelength conversion layer 20 during the wavelength conversion is conducted from the first side 11 along the heat transferring path, for example in the vertical direction (i.e. z axis), and is dissipated through the first thermal conductive plate 10, the second thermal conductive plate 30, the third thermal conductive plate 40 and the fourth thermal conductive plate 60, to enhance heat dissipation efficiency. It should be further noted that the laser light L generally excites the conversion region 21 of the wavelength conversion layer 20 and is converged into a light spot. The illumination area of the above-mentioned light spot is the main area of heat generation. Usually, the illumination area of the light spot is smaller than the area of the conversion region 21. Therefore, the heat transferring path described above includes not only a vertical direction (i.e. z axis) from the heat generation area, but also a planar direction (x-axis and y-axis) on each of the thermal conductive plates and the adhesive layers. Therefore, the heat dissipation efficiency is enhanced.

Notably, in the application of reflective wavelength conversion device, the first thermal conductive plate 10 is provided with the reflective surface. Moreover, the wavelength conversion device 1b further includes the second thermal conductive plate 30 and the third thermal conductive plate 40. In a first example, the second thermal conductive plate 30 of the wavelength conversion device 1b is an aluminum nitride plate, and has a thickness of 0.5 mm. Preferably but not exclusively, titanium dioxide ($TiO_2$) is mixed with glass powders, cellulose and mono-butyl ether for coating, degassing, drying and high-temperature sintering, and then the first thermal conductive plate 10 is formed on the surface of the second thermal conductive plate 30. Preferably but not exclusively, yttrium aluminum garnet (YAG) is mixed with glass powders, cellulose and mono-butyl ether for coating, degassing, drying and high-temperature sintering, and thus the wavelength conversion layer 20 is formed on the first side 11 of the first thermal conductive plate 10. Preferably but not exclusively, the third thermal conductive plate 40 is an aluminum plate and has a thickness of 0.7 mm. The third thermal conductive plate 40 is connected to the second thermal conductive plate 30 through the first adhesive layer 50. Preferably but not exclusively, the first bonding region 51 is silver paste, and the second bonding region 52 is silicone. In a second example, the fourth thermal conductive plate 60 of the wavelength conversion device 1c is a copper plate, and has a thickness of 0.7 mm, so that the fourth thermal conductive plate 60 is further attached to the third thermal conductive plate 40 shown in the first example through the second adhesive layer 70. Preferably but not exclusively, the third bonding region 71 is silver paste, and the fourth bonding region 72 is silicone.

Figure 6:
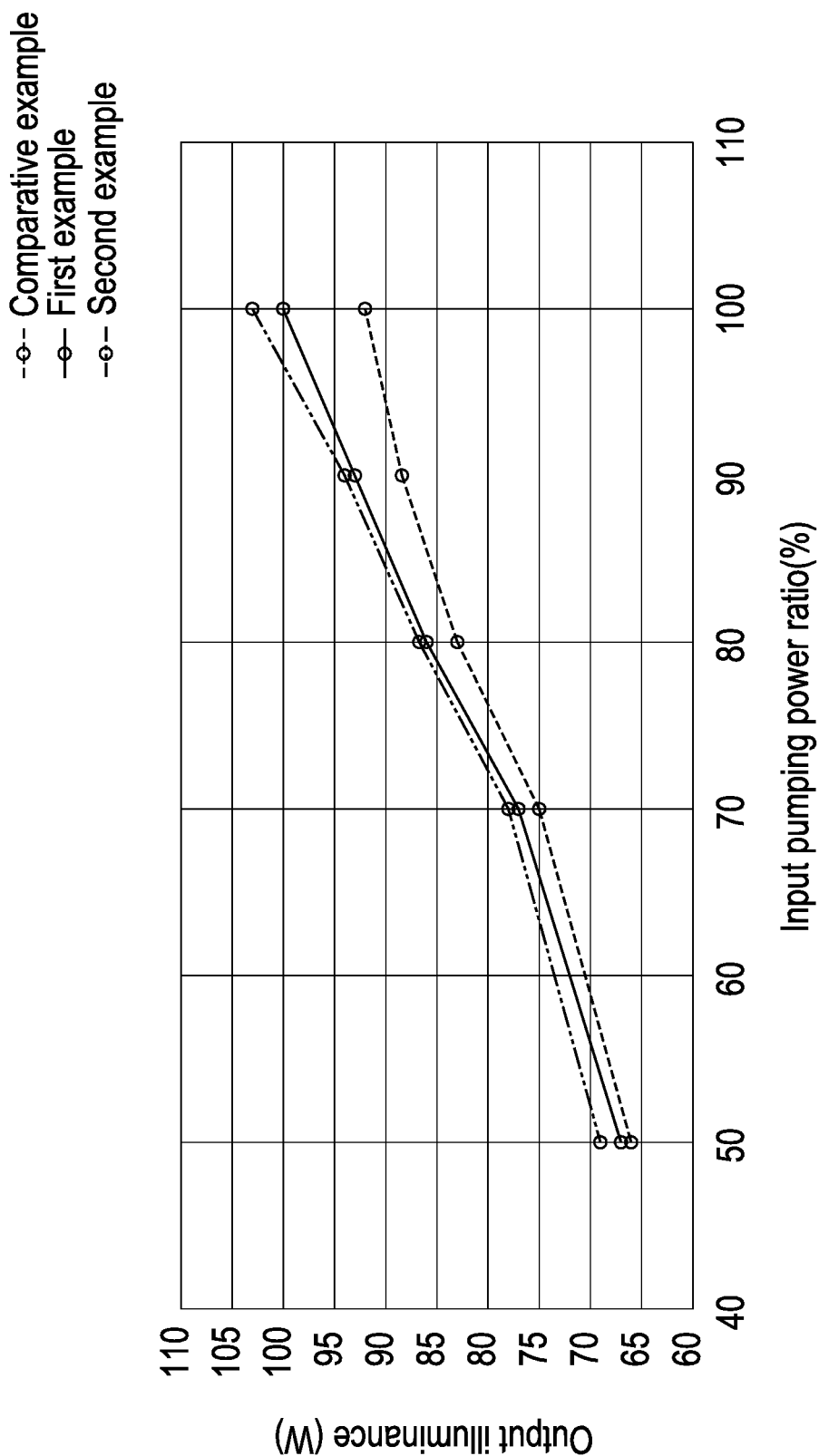
FIG. 6 shows the comparison of output illuminance at different input pumping power ratios among a first example, a second example and a comparative example.

FIG. 6 shows the comparison of output illuminance at different input pumping power ratios among a first example, a second example and a comparative example. In the comparative example, the third thermal conductive plate 40, the first adhesive layer 50, the fourth thermal conductive plate 60 and the second adhesive layer 70 of the wavelength conversion device are omitted. Compared with the comparative example at the same input pumping power ratio (%), the output illuminance (W) of the first example or the second sample is greater than that of the comparative example. Since the heat generated by the at least one conversion region 21 of the wavelength conversion layer 20 during the wavelength conversion in the first example and the second example is conducted from the first side 11 along for example the vertical direction (i.e. z axis) and is transferred through the first thermal conductive plate 10, the second thermal conductive plate 30 and the third thermal conductive plate 40 or further transferred through the fourth thermal conductive 60, the heat dissipation efficiency is enhanced, thereby avoiding deterioration of conversion performance.

Notably, in the application of the reflective wavelength conversion device, the first thermal conductive plate 10 includes a reflective surface. The constituent material of the second thermal conductive plate 30 configured to carry the first thermal conductive plate 10 is adjustable according to the practical requirements. In an embodiment, when the first thermal conductive plate 10 is formed by sintering, the second thermal conductive plate 30 is for example but not limited to an alumina substrate or an aluminum nitride substrate, and the third thermal conductive plate 40 and the fourth thermal conductive plate 60 is for example but not limited to an aluminum plate and a copper plate, respectively, so as to optimize the heat transferring path. In another embodiment, to form the first thermal conductive plate 10 having high reflectivity, the first thermal conductive plate 10 is for example an aluminum plate having high reflectivity, and the second thermal conductive plate 30 is for example a copper plate. Since the thermal conductivity coefficient of the second thermal conductive plate 30 is greater than the thermal conductivity coefficient of the first thermal conductive plate 10, it is advantageous to minimize the thermal resistance of the heat transferring path. Thus, the heat generated by the at least one conversion region 21 of the wavelength conversion layer 20 during the wavelength conversion is dissipated along the heat transferring path to enhance the heat dissipation efficiency.

Figure 7:
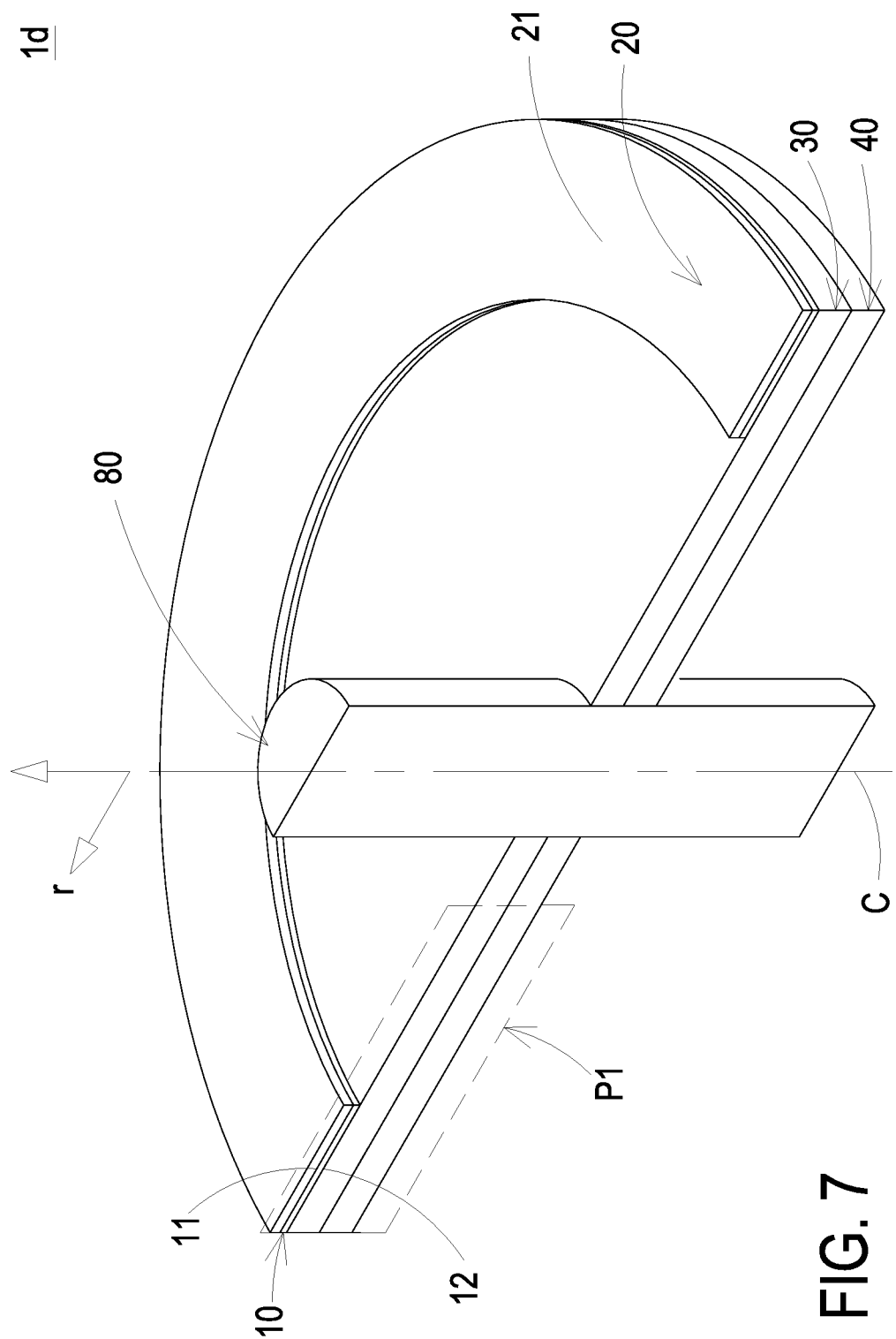
FIG. 7 is a cross-sectional structure illustrating a wavelength conversion device according to a fifth embodiment of the present disclosure.
Figure 8:
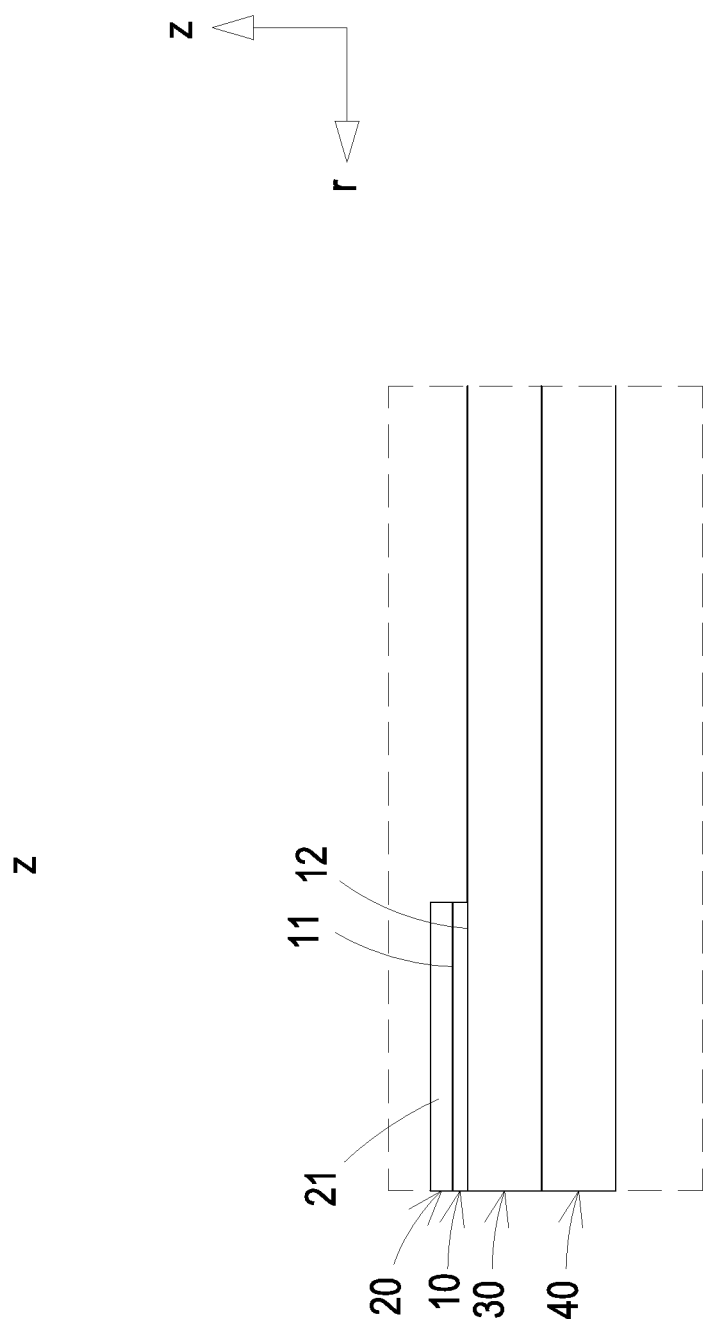
FIG. 8 is a cross-sectional view illustrating the region P1 of FIG. 7.

FIG. 7 is a cross-sectional structure illustrating a wavelength conversion device according to a fifth embodiment of the present disclosure. FIG. 8 is a cross-sectional view illustrating the region P1 of FIG. 7. In the embodiment, the structures, elements and functions of the wavelength conversion device 1d are similar to those of the wavelength conversion device 1a in FIG. 3. The elements and features indicated by the numerals similar to those of the second embodiment mean similar elements and features, and are not redundantly described herein. In the embodiment, the wavelength conversion device 1d is, for example but not limited to, a phosphor wheel of a projector. The wavelength conversion device 1d is constructed as a disk body, and further includes a driving component 80, which is connected to one of the first thermal conductive plate 10, the second thermal conductive plate 30 and the third thermal conductive plate 40, and configured to drive the wavelength conversion device 1d to rotate around a central rotating shaft C of the wavelength conversion device 1d. It should be noted that the wavelength conversion device 1d of the present disclosure is not limited to static use or dynamic use in practical applications. Preferably but not exclusively, in the embodiment, one of the first thermal conductive plate 10, the second thermal conductive plate 30 and the third thermal conductive plate 40 is connected to the driving component 80 such as a motor shaft through an adhesive or a latching element. The wavelength conversion device 1d is driven by the driving component 80, such as the motor shaft, to generate a motion, for example rotate around the central rotating shaft C. In other embodiments, the driving component 80 is omitted. It won't be redundantly described hereafter. In the embodiment, the wavelength conversion layer 20 is arranged in a ring shape, and the central rotating shaft C pass through the center of the ring shape. The thermal conductivity coefficients of the first thermal conductive plate 10, the second thermal conductive plate 30 and the third thermal conductive plate 40 are increased from the first side 11 along the heat transferring path for example in the vertical direction (i.e. z axis). It is beneficial to minimize the heat resistance of the heat transferring path. Thus, the heat generated by the at least one conversion region 21 of the wavelength conversion layer 20 during the wavelength conversion is dissipated along the heat transferring path, for example the direction of z axis, to enhance heat dissipation efficiency. On the other hand, taking the wavelength conversion device 1d as an example of a transmissive wavelength conversion device, the first thermal conductive plate 10, the second thermal conductive plate 30 and the third thermal conductive plate 40 are transparent. The thermal conductivity coefficients of the first thermal conductive plate 10, the second thermal conductive plate 30 and the third thermal conductive plate 40 are increased from the first side 11 along the heat transferring path for example in the vertical direction (i.e. z axis). It is beneficial to minimize the heat resistance of the heat transferring path. Thus, the heat generated by the at least one conversion region 21 of the wavelength conversion layer 20 during the wavelength conversion is dissipated along the heat transferring path to enhance heat dissipation efficiency. In other embodiments, one of the first thermal conductive plate 10, the second thermal conductive plate 30 and the third thermal conductive plate 40 is omitted. The present disclosure is not limited thereto.

Figure 9:
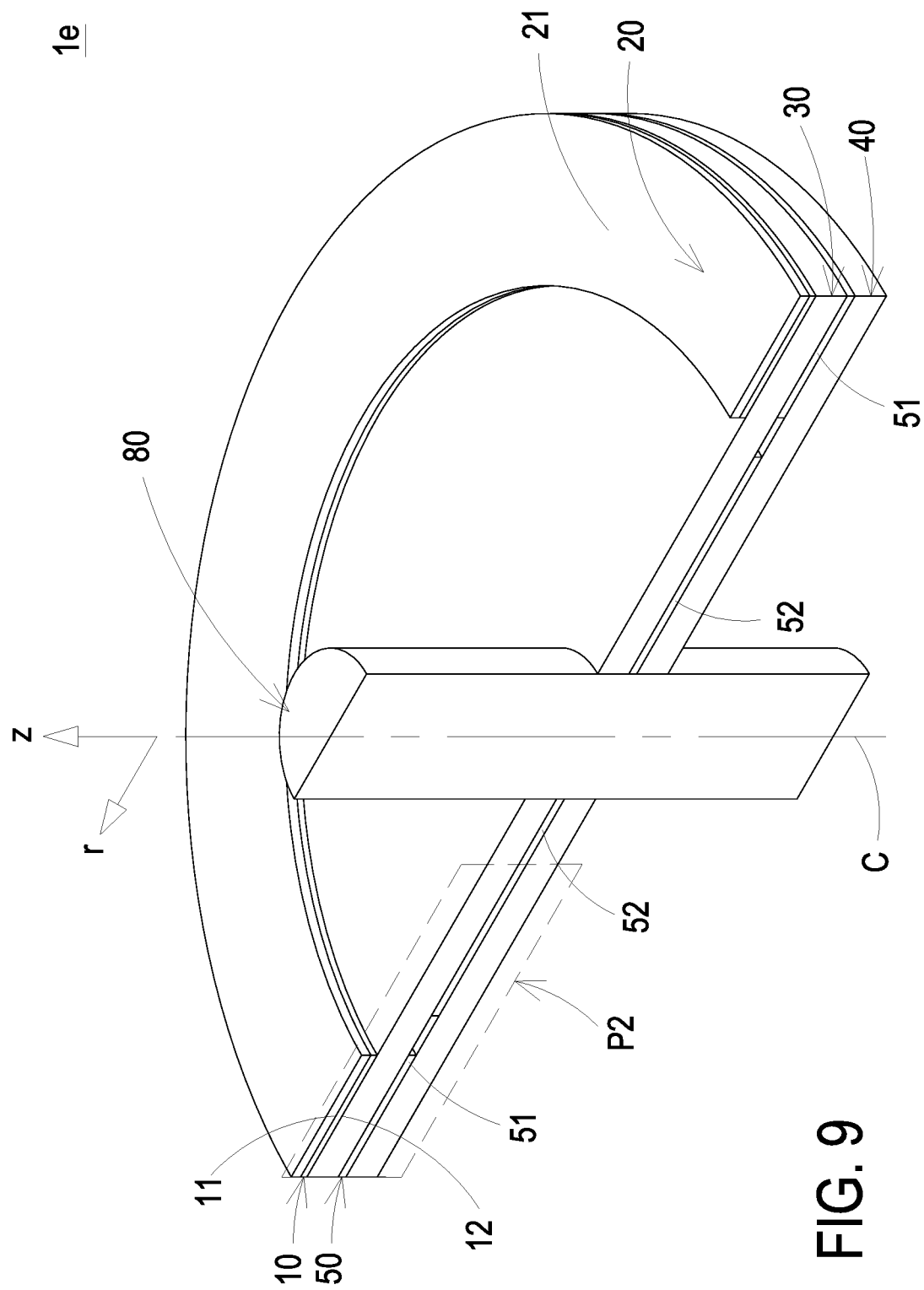
FIG. 9 is a cross-sectional structure illustrating a wavelength conversion device according to a sixth embodiment of the present disclosure.
Figure 10:
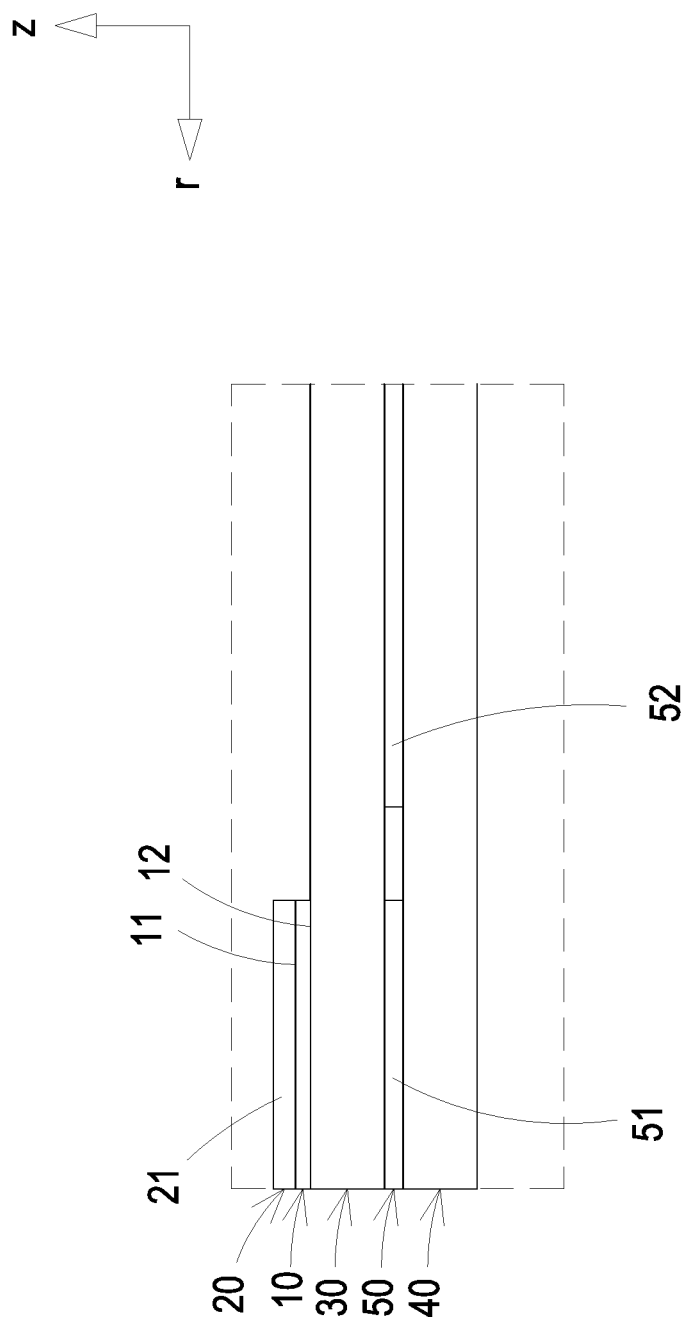
FIG. 10 is a cross-sectional view illustrating the region P2 of FIG. 9.

FIG. 9 is a cross-sectional structure illustrating a wavelength conversion device according to a sixth embodiment of the present disclosure. FIG. 10 is a cross-sectional view illustrating the region P2 of FIG. 9. In the embodiment, the structures, elements and functions of the wavelength conversion device 1e are similar to those of the wavelength conversion device 1d in FIGS. 7 and 8. The elements and features indicated by the numerals similar to those of the fifth embodiment mean similar elements and features, and are not redundantly described herein. In the embodiment, the wavelength conversion device 1e is constructed as a disk body, and is applicable to a reflective wavelength conversion device. Preferably but not exclusively, the first thermal conductive plate 10 is made of titanium dioxide (TiO$_2$) and silicon oxide polymer (Silicone), and disposed on the second thermal conductive plate 30, so that a reflective surface is formed on the first side 11 in a ring shape. In other embodiments, the first thermal conductive plate 10 is formed, for example, by sintering of titanium dioxide mixed with glass powder or titanium dioxide mixed with alumina powder. Preferably but not exclusively, the second thermal conductive plate 30 is an aluminum nitride ceramic plate. In the embodiment, the wavelength conversion device 1e further includes a first adhesive layer 50. The first adhesive layer 50 is disposed between the second thermal conductive plate 30 and the third thermal conductive plate 40. The first adhesive layer 50 includes at least one first bonding region 51 and at least one second bonding region 52. In the embodiment, the at least one first bonding region 51 spatially corresponds to the at least one conversion region 21 of the wavelength conversion layer 20. The thermal conductivity coefficient of the first bonding region 51 is not less than the thermal conductivity coefficient of the second bonding region 52. In the embodiment, the first bonding region 51 and the second bonding region 52 form an outer ring and an inner ring, respectively. In the embodiment, a vertical projection of the conversion region 21 of the wavelength conversion layer 20 on the first thermal conductive plate 10 and a vertical projection of the first bonding region 51 on the first thermal conductive plate 10 or the second thermal conductive plate 30 are at least partially overlapped. In the embodiment, the first bonding region 51 is made of a thermal conductive material, and the thermal conductive material includes at least one selected from the group consisting of silver, copper, diamond powder and graphene, and is further mixed with an adhesive. Preferably but not exclusively, the second bonding region 52 is made of an adhesive, such as silicone, epoxy or other adhesive. The present disclosure is not limited thereto.

In the embodiment, the second thermal conductive plate 30 and the third thermal conductive plate 40 are connected through the first adhesive layer 50. The first bonding region 51 of the first adhesive layer 50 has a high thermal conductivity coefficient, spatially corresponds to the at least one conversion region 21 and is disposed adjacent to an outer circumference of the wavelength conversion device 1e. It ensures that the heat transferring path is optimized. Thus, the heat generated by the conversion region 21 during the wavelength conversion is efficiently dissipated along the heat transferring path, to enhance the heat dissipation efficiency. On the other hand, since the second bonding region 52 of the first adhesive layer 50 is provided with good adhesion and disposed adjacent to the central rotating shaft C, it ensures that the second thermal conductive plate 30 and the third thermal conductive plate 40 are connected firmly and further prevents from forming the thermal resistance on the heat transferring path at the same time. The second bonding region 52 disposed adjacent to the central rotating shaft C is integrated with the driving component 80, so that the driving component 80 is connected to the second thermal conductive plate 30 and the third thermal conductive plate 40. Thus, the heat generated by the at least one conversion region 21 of the wavelength conversion layer 20 during the wavelength conversion is conducted from the first side 11 along the heat transferring path, for example in the vertical direction (i.e. z axis), and is transferred through the outer ring structure, which is constructed by the first thermal conductive plate 10, the second thermal conductive plate 30 and the third thermal conductive plate 40. The heat dissipation efficiency is enhanced effectively.

Figure 11:
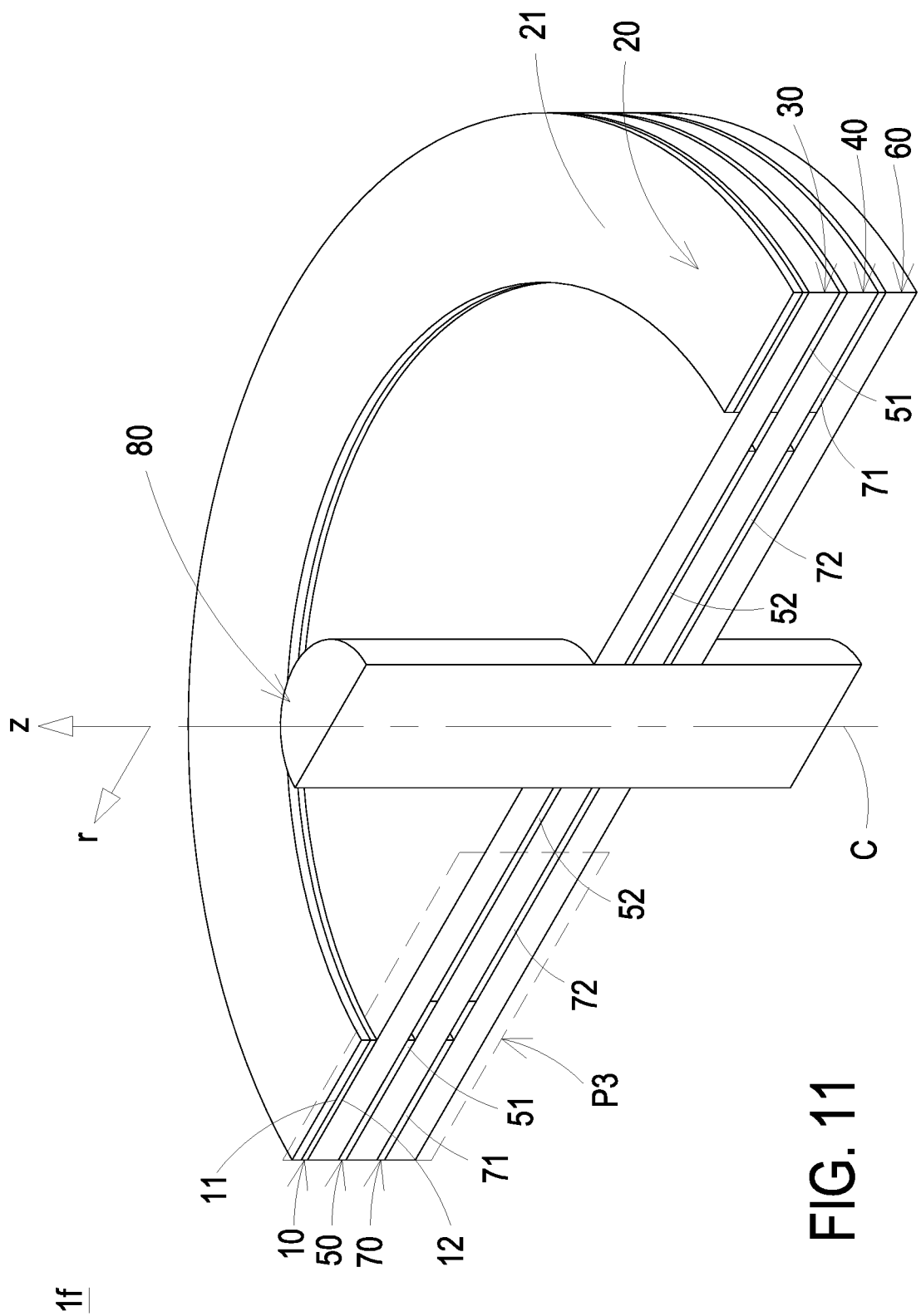
FIG. 11 is a cross-sectional structure illustrating a wavelength conversion device according to a seventh embodiment of the present disclosure.
Figure 12:
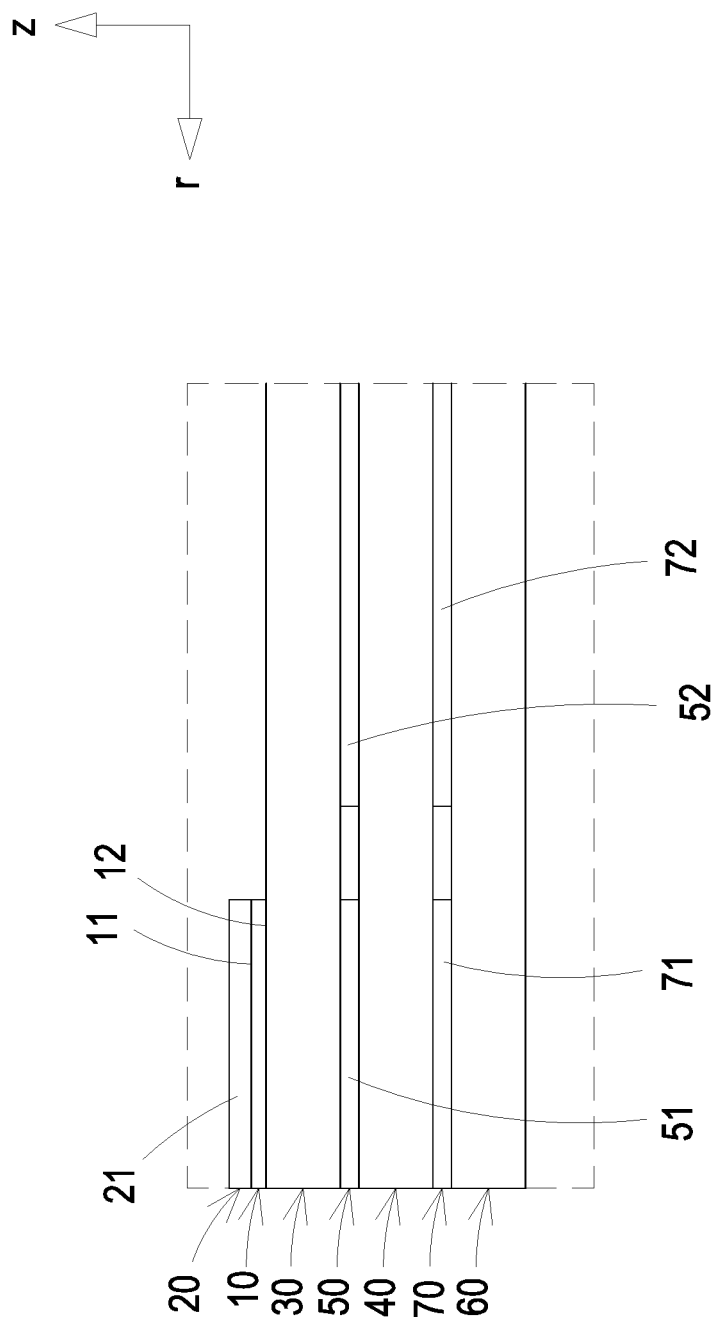
FIG. 12 is a cross-sectional view illustrating the region P3 of FIG. 11.

FIG. 11 is a cross-sectional structure illustrating a wavelength conversion device according to a seventh embodiment of the present disclosure. FIG. 12 is a cross-sectional view illustrating the region P3 of FIG. 11. In the embodiment, the structures, elements and functions of the wavelength conversion device 1f are similar to those of the wavelength conversion device 1e in FIGS. 9 and 10. The elements and features indicated by the numerals similar to those of the sixth embodiment mean similar elements and features, and are not redundantly described herein. In the embodiment, the wavelength conversion device 1f is constructed as a disk body, and further includes a fourth thermal conductive plate 60 and a second adhesive layer 70. The second adhesive layer 70 is disposed between the third thermal conductive plate 40 and the fourth thermal conductive plate 60, and includes at least one third bonding region 71 and at least one fourth bonding region 72. In the embodiment, the at least one third bonding region 71 spatially corresponds to the first bonding region 51, and the thermal conductivity coefficient of the third bonding region 71 is not less than the thermal conductivity coefficient of the fourth bonding region 72. Preferably but not exclusively, the third bonding region 71 spatially corresponds to the first bonding region 51 to form an outer ring. Preferably but not exclusively, the fourth bonding region 72 spatially corresponds to the second bonding region 52 to form an inner ring. In the embodiment, a vertical projection of the at least one conversion region 21 of the wavelength conversion layer 20 on the second thermal conductive plate 30 and a vertical projection of the first bonding region 51 on the second thermal conductive plate 30 are at least partially overlapped. A vertical projection of the first bonding region 51 on the third thermal conductive plate 40 and a vertical projection of the third bonding region 71 on the third thermal conductive plate 40 are at least partially overlapped. Preferably but not exclusively, the first bonding region 51 and the third bonding region 71 are made of a thermal conductive material, respectively, and the thermal conductive material includes at least one selected from the group consisting of silver, copper, diamond powders and graphene, and is further mixed with an adhesive. Preferably but not exclusively, the second bonding region 52 and the fourth bonding region 72 are made of silicone, epoxy or other adhesive. The present disclosure is not limited thereto.

In the embodiment, the second thermal conductive plate 30, the third thermal conductive plate 40 and the fourth thermal conductive plate 60 are connected by the first adhesive layer 50 and the second adhesive layer 70, respectively. The first bonding region 51 of the first adhesive layer 50 and the third bonding region 71 of the second adhesive layer 70 have high thermal conductivity coefficients, spatially correspond to the at least one conversion region 21 and are disposed adjacent to an outer circumference of the wavelength conversion device 1f. It ensures that the heat transferring path is optimized. Thus, the heat generated by the conversion region 21 during the wavelength conversion is efficiently dissipated along the heat transferring path, to enhance the heat dissipation efficiency. On the other hand, the second bonding region 52 of the first adhesive layer 50 and the fourth bonding region 72 of the second adhesive layer 70 are provided with good adhesion and disposed adjacent to the central rotating shaft C. It ensures the connection of the second thermal conductive plate 30 and the third thermal conductive plate 40 and the connection of the third thermal conductive plate 40 and the fourth thermal conductive plate 60, and further facilitates the driving component 80 to integrally connected to the second thermal conductive plate 30, the third thermal conductive plate 40 and the fourth thermal conductive plate 60. Thus, the heat generated by the at least one conversion region 21 of the wavelength conversion layer 20 during the wavelength conversion is conducted from the first side 11 along the heat transferring path, for example in the vertical direction (i.e. z axis), and transferred through the outer ring structure, which is constructed by the first thermal conductive plate 10, the second thermal conductive plate 30, the third thermal conductive plate 40 and the fourth thermal conductive plate 60. The heat dissipation efficiency is enhanced effectively.

In summary, the present disclosure provides a wavelength conversion device. The wavelength conversion device includes a first thermal conductive plate having a lower thermal conductivity coefficient and a second thermal conductive plate having a higher thermal conductivity coefficient, so as to form a heterogeneous composite board. A wavelength conversion layer is disposed on a first side of the first thermal conductive plate having the lower thermal conductivity coefficient, and the second thermal conductive plate having the higher thermal conductivity coefficient is connected to a second side of the first thermal conductive plate. Since the thermal conductivity coefficients of the at least two thermal conductive plates are increased along the heat transferring path, it is beneficial to minimize the thermal resistance of the heat transferring path. Thus, the heat generated by the wavelength conversion layer during the wavelength conversion is dissipated along the heat transferring path to enhance the heat dissipation efficiency. Moreover, the wavelength conversion device is applicable to for example a reflective wavelength conversion device or a transmissive wavelength conversion device. In the reflective wavelength conversion device, the wavelength conversion layer is disposed on the reflective surface of the first thermal conductive plate, and the second thermal conductive plate and the third thermal conductive are sequentially disposed on the second surface, which is opposite to the reflection surface of the first thermal conductive plate. Since the thermal conductivity coefficients of the at least three thermal conductive plates are increased from the reflective surface along the heat transferring path, it is beneficial to minimize the thermal resistance of the heat transferring path. Thus, the heat generated by the wavelength conversion layer during the wavelength conversion is dissipated along the heat transferring path to enhance heat dissipation efficiency. Furthermore, the wavelength conversion device is applicable to for example a phosphor wheel of a projector. The wavelength conversion layer includes at least one conversion region arranged for example in a ring. In the reflective wavelength conversion application, the wavelength conversion layer is disposed on the reflective surface of the plurality of thermal conductive plates, and the thermal conductivity coefficients of the plurality of thermal conductive plates are increased from the reflective surface along the heat transferring path. Thus, it is beneficial to minimize the thermal resistance of the heat transferring path. In addition, the plurality of thermal conductive plates are connected through at least one adhesive layer. The adhesive layer comprises at least two bonding regions. One bonding region spatially corresponding to the conversion region has a thermal conductivity coefficient, not less than that of another bonding region. Thus, it ensures that the heat transferring path is optimized. The heat generated by the wavelength conversion layer during the wavelength conversion is efficiently dissipated along the heat transferring path, thereby enhancing the heat dissipation efficiency and avoiding the degradation of conversion performance.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wavelength conversion device comprising:
    a first thermal conductive plate comprising a first side and a second side, wherein the first side and the second side are opposite to each other;
    a wavelength conversion layer disposed on the first side of the first thermal conductive plate and configured to perform a wavelength conversion;
    a second thermal conductive plate disposed on the second side of the first thermal conductive plate, wherein the thermal conductivity coefficient of the second thermal conductive plate is greater than the thermal conductivity coefficient of the first thermal conductive plate, and the first thermal conductive plate and the second thermal conductive plate are configured to conduct heat generated by the wavelength conversion layer during the wavelength conversion; and
    a third thermal conductive plate connected to the second thermal conductive plate, wherein the thermal conductivity coefficient of the third thermal conductive plate is greater than the thermal conductivity coefficient of the second thermal conductive plate, wherein the first side of the first thermal conductive plate comprises a reflective surface, and at least one conversion region of the wavelength conversion layer spatially corresponds to the reflective surface.

2. The wavelength conversion device according to claim 1, further comprising a first adhesive layer disposed between the first thermal conductive plate and the second thermal conductive plate and comprising at least one first bonding region and at least one second bonding region, wherein the at least one first bonding region spatially corresponds to the at least one conversion region, and the thermal conductivity coefficient of the first bonding region is not less than the thermal conductivity coefficient of the second bonding region.

3. The wavelength conversion device according to claim 2, wherein a vertical projection of the wavelength conversion layer on the first thermal conductive plate and a vertical projection of the first bonding region on the first thermal conductive plate are at least partially overlapped.

4. The wavelength conversion device according to claim 2, further comprising a second adhesive layer disposed between the second thermal conductive plate and the third thermal conductive plate and comprising at least one third bonding region and at least one fourth bonding region, wherein the at least one third bonding region spatially corresponds to the first bonding region, and the thermal conductivity coefficient of the third bonding region is not less than the thermal conductivity coefficient of the fourth bonding region.

5. The wavelength conversion device according to claim 4, wherein a vertical projection of the first bonding region on the second thermal conductive plate and a vertical projection of the third bonding region on the second thermal conductive plate are at least partially overlapped.

6. The wavelength conversion device according to claim 4, wherein the first bonding region and the third bonding region are made of a thermal conductive material, respectively, and the thermal conductive material includes at least one selected from the group consisting of silver, copper, diamond powder and graphene, and is further mixed with an adhesive.

7. The wavelength conversion device according to claim 4, wherein the second bonding region and the fourth bonding region are made of an adhesive, respectively.

8. The wavelength conversion device according to claim 1, wherein the wavelength conversion device is a phosphor wheel, and the wavelength conversion layer is arranged in a ring shape.

9. A wavelength conversion device comprising:
a first thermal conductive plate comprising a first side and a second side, wherein the first side and the second side are opposite to each other;
a wavelength conversion layer disposed on the first side of the first thermal conductive plate, comprising at least one conversion region and configured to perform a wavelength conversion;
at least one second thermal conductive plate disposed on the second side of the first thermal conductive plate, wherein the thermal conductivity coefficient of the second thermal conductive plate is greater than the thermal conductivity coefficient of the first thermal conductive plate, and the first thermal conductive plate and the second thermal conductive plate are configured to conduct heat generated by the wavelength conversion layer during the wavelength conversion; and
at least one first adhesive layer disposed between the first thermal conductive plate and the second thermal conductive plate and comprising at least one first bonding region and at least one second bonding region, wherein the at least one first bonding region spatially corresponds to the at least one conversion region, and the thermal conductivity coefficient of the first bonding region is greater than the thermal conductivity coefficient of the second bonding region.

10. The wavelength conversion device according to claim 9, further comprising a third thermal conductive plate connected to the second thermal conductive plate, wherein the thermal conductivity coefficient of the third thermal conductive plate is greater than the thermal conductivity coefficient of the second thermal conductive plate, wherein the first side of the first thermal conductive plate comprises a reflective surface, and the at least one conversion region of the wavelength conversion layer spatially corresponds to the reflective surface.

11. The wavelength conversion device according to claim 10, further comprising a second adhesive layer disposed between the second thermal conductive plate and the third thermal conductive plate and comprising at least one third bonding region and at least one fourth bonding region, wherein the at least one third bonding region spatially corresponds to the first bonding region, and the thermal conductivity coefficient of the third bonding region is not less than the thermal conductivity coefficient of the fourth bonding region.

12. The wavelength conversion device according to claim 11, wherein a vertical projection of the wavelength conversion layer on the first thermal conductive plate and a vertical projection of the first bonding region on the first thermal conductive plate are at least partially overlapped, wherein a vertical projection of the first bonding region on the second thermal conductive plate and a vertical projection of the third bonding region on the second thermal conductive plate are at least partially overlapped.

13. The wavelength conversion device according to claim 11, wherein the first bonding region and the third bonding region are made of a thermal conductive material, respectively, and the thermal conductive material includes at least one selected from the group consisting of silver, copper, diamond powder and graphene, and is further mixed with an adhesive.

14. The wavelength conversion device according to claim 11, wherein the second bonding region and the fourth bonding region are made of an adhesive, respectively.

15. The wavelength conversion device according to claim 9, wherein the first bonding region and the second bonding region form an outer ring and an inner ring, respectively.

16. A wavelength conversion device comprising:
a first thermal conductive plate comprising a first side and a second side, wherein the first side and the second side are opposite to each other;
a wavelength conversion layer disposed on the first side of the first thermal conductive plate and configured to perform a wavelength conversion;
a second thermal conductive plate disposed on the second side of the first thermal conductive plate, wherein the thermal conductivity coefficient of the second thermal conductive plate is greater than the thermal conductivity coefficient of the first thermal conductive plate; and
a third thermal conductive plate connected to the second thermal conductive plate, wherein the thermal conductivity coefficient of the third thermal conductive plate is greater than the thermal conductivity coefficient of the second thermal conductive plate, and the first thermal conductive plate, the second thermal conductive plate and the third thermal conductive plate are configured to conduct heat generated by the wavelength conversion layer during the wavelength conversion.

17. The wavelength conversion device according to claim 16, further comprising a driving component connected to one of the first thermal conductive plate, the second thermal conductive plate and the third thermal conductive plate, and configured to drive the wavelength conversion device to rotate around a central rotating shaft of the wavelength conversion device.

18. The wavelength conversion device according to claim 17, wherein the wavelength conversion layer is arranged in a ring shape, and the central rotating shaft passes through a center of the ring shape.

19. The wavelength conversion device according to claim 16, further comprising:
a first adhesive layer disposed between the first thermal conductive plate and the second thermal conductive plate and comprising at least one first bonding region and at least one second bonding region, wherein the at least one first bonding region spatially corresponds to the at least one conversion region, and the thermal conductivity coefficient of the first bonding region is not less than the thermal conductivity coefficient of the second bonding region; and a second adhesive layer disposed between the second thermal conductive plate and the third thermal conductive plate and comprising at least one third bonding region and at least one fourth bonding region, wherein the at least one third bonding region spatially corresponds to the first bonding region, and the thermal conductivity coefficient of the third bonding region is not less than the thermal conductivity coefficient of the fourth bonding region.

20. The wavelength conversion device according to claim 19, wherein a vertical projection of the wavelength conversion layer on the first thermal conductive plate and a vertical projection of the first bonding region on the first thermal conductive plate are at least partially overlapped, wherein a vertical projection of the first bonding region on the second thermal conductive plate and a vertical projection of the third bonding region on the second thermal conductive plate are at least partially overlapped.

21. The wavelength conversion device according to claim 19, wherein the first bonding region and the third bonding region are made of a thermal conductive material, respectively, and the thermal conductive material includes at least one selected from the group consisting of silver, copper, diamond powders and graphene, and is further mixed with an adhesive, wherein the second bonding region and the fourth bonding region are made of an adhesive, respectively.

\* \* \* \* \*